United States Patent [19]

Rasor

[11] Patent Number: 4,736,878
[45] Date of Patent: Apr. 12, 1988

[54] LUGGAGE CARRIER WITH CLAMP ON SUSPENDED CROSS RAILS

[75] Inventor: William A. Rasor, Goodells, Mich.

[73] Assignee: Masco Industries, Inc., Taylor, Mich.

[21] Appl. No.: 904,015

[22] Filed: Sep. 5, 1986

[51] Int. Cl.$^4$ ................................................ B60R 9/00
[52] U.S. Cl. ..................................... 224/321; 224/325
[58] Field of Search ............... 224/309, 316, 314, 317, 224/318, 319, 320, 321, 322, 324, 325, 326, 327, 330; 211/123, 60 SK; 248/231.4; 403/190, 191, 233, 234, 236

[56] References Cited

U.S. PATENT DOCUMENTS

| | | |
|---|---|---|
| 3,064,868 | 11/1962 | Treydte . |
| 3,221,960 | 12/1965 | Gleason et al. . |
| 3,261,520 | 7/1966 | Andersson ........................ 224/325 |
| 4,487,348 | 12/1984 | Mareydt . |

FOREIGN PATENT DOCUMENTS 413625 12/1966 Switzerland ....................... 224/325

Primary Examiner—Henry J. Recla
Assistant Examiner—David Voorhees
Attorney, Agent, or Firm—Edgar A. Zarins; Leon E. Redman; Malcolm L. Sutherland

[57] ABSTRACT

A cross rail for forming a load-bearing rack of a luggage carrier which is detachably secured to the side members that form the fixed frame of the carrier. The frame is supported above the surface of the vehicle and the load-bearing surface is suspended between the frame and the body of the vehicle. The individual cross members include an elongated cross rail member with T-shaped end caps secured to each end of the member to which individual clamps are pivotaly secured. Each clamp includes an upper clamp member, a lower clamp member received by the upper clamp member, and a bolt which connects the two clamp members in adjustable relation to each other. The two clamp members form a substantially C-shaped clamping channel which is adjustable by rotating the bolt accordingly. Thus, the cross member is capable of being utilized with different frame sizes simply by adjusting the clamping channel.

20 Claims, 1 Drawing Sheet

U.S. Patent
Apr. 12, 1988
4,736,878
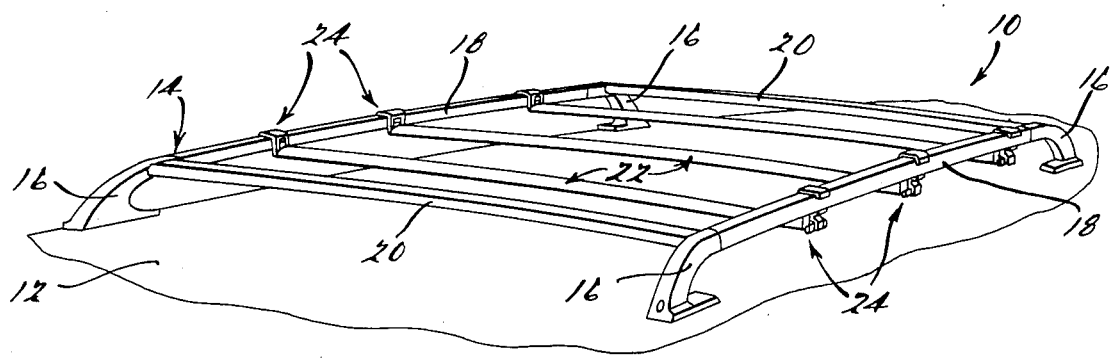
FIG. 1.
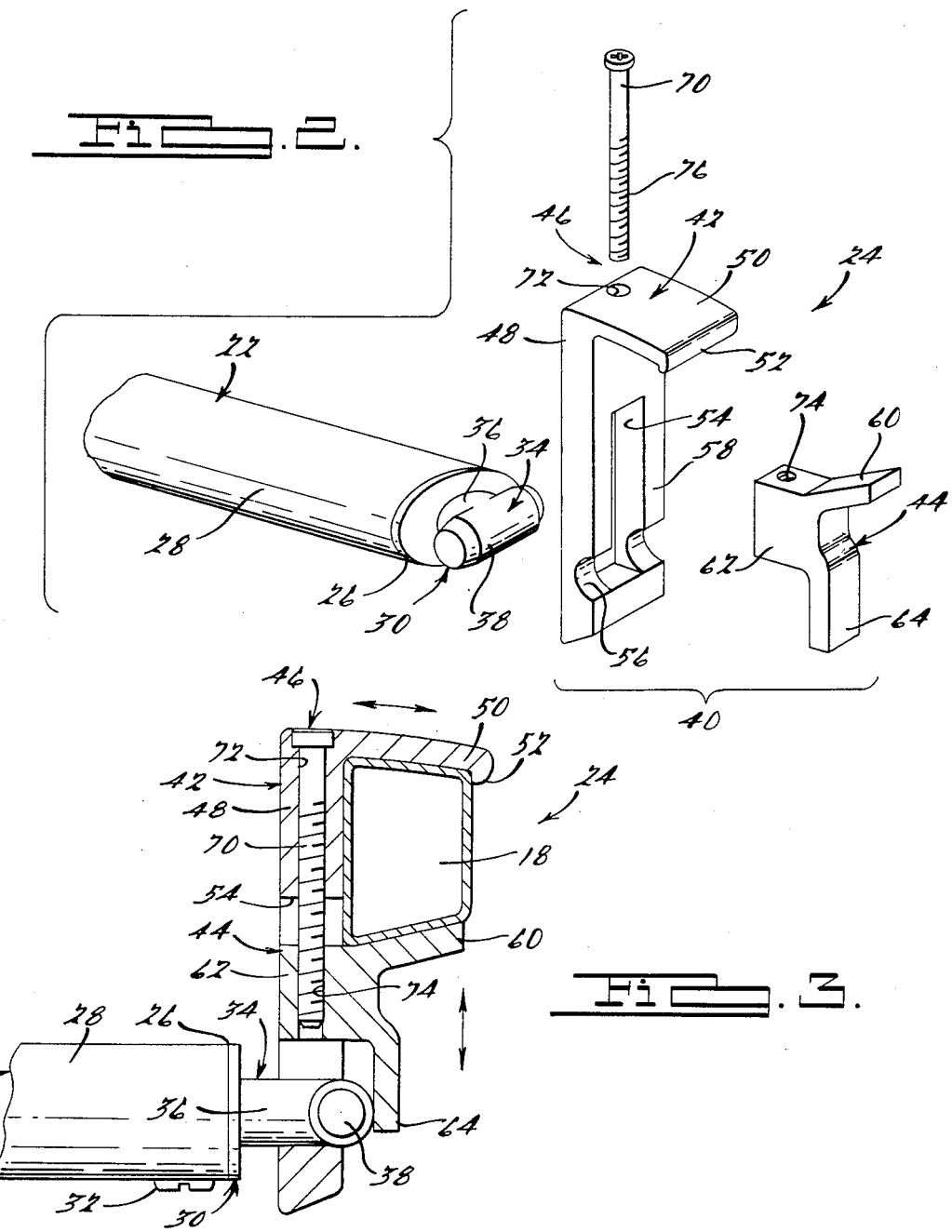
FIG. 2.
FIG. 3.

LUGGAGE CARRIER WITH CLAMP ON SUSPENDED CROSS RAILS

BACKGROUND OF THE INVENTION

I. Field of the Invention

This invention relates to luggage carriers adapted to be mounted to a vehicle surface and, in particular, to an adjustable cross rail for forming a suspended load-bearing rack for the luggage carrier.

II. Description of the Prior Art

Luggage racks mounted to the exterior surface of automotive vehicles have long been utilized to transport luggage exteriorly of the vehicle. The simplest form of luggage carrier is constructed of a series of parallel slats mounted flush with the top of the vehicle. These slats are designed to provide extra support while preventing damage to the roof top. However, these racks lack means for constraining the baggage which oftentimes resulted in lost luggage as it slid off the rack.

In order to overcome this disadvantage, an elevated frame was added which prevented the baggage from sliding off of the carrier due to changes in momentum. This frame generally extends about the peripheral edge of the slats which support the luggage and is supported above the vehicle surface by stanchions mounted to the roof top. Although providing support and constraint of a majority of articles, it was found that heavier packages tended to cause the support slats and the roof top to bow under the weight. However, because of vehicle weight and aerodynamic constraints, support racks manufactured from heavier materials were undesirable. Moreover, the separate assembly and mounting of the peripheral frame and support rack increased production costs.

As a result, elevated racks were developed which did not depend on the support of the vehicle top. Moreover, since these luggage carriers could be assembled prior to mounting, manufacturing and assembly costs were reduced. Generally, these elevated racks do not include any peripheral constraint and therefore may cause loss of luggage. However, more recently elevated carriers which employ a suspended load-bearing rack have been developed. The load-bearing rack of these carriers is generally suspended from the peripheral frame yet space above the vehicle surface. With this construction, heavier packages may cause the cross rails of the rack to bow slightly without contacting or causing damage to the surface of the vehicle. Moreover, this elevated construction provides improved aerodynamics by allowing air to travel beneath the luggage across the vehicle top. However, the suspended cross rails are generally fixedly secured to the side rails of the frame and, therefore, do not provide means for adjusting the distance between the rails for luggage or packages of different sizes and weights. In addition, the fixed cross rails do not allow for removal of the suspended rack during periods of non-use.

In order to provide such flexibility, adjustable cross rails were developed which clampingly engage a portion of the fixed side rail of the frame. However, in the past known adjustable cross rails, the clamping mechanism is secured to a protruding surface of the rail thereby increasing manufacturing costs. Thus, these clamping devices are designed to cooperate only with specially manufactured frames. Moreover, these known cross rails cannot be interchanged or utilized on luggage carriers having frame members with a non-standard diameter.

SUMMARY OF THE PRESENT INVENTION

The present invention is an improved adjustable cross rail for a luggage carrier which overcomes the disadvantages of the previously known rails.

The cross rail according to the present invention is designed to be utilized in forming a suspended load-bearing rack of a luggage carrier. The luggage carrier includes an elevated frame which is supported by a series of stanchions above the surface of the vehicle. The cross rail generally includes an adjustable clamp mounted to its ends which defines a variable clamping channel for receiving side rails of different diameters. The cross rail includes a cross rail member with substantially T-shaped end caps fixedly received within the ends thereof. The T-shaped end cap is formed with a cylindrical cross portion disposed perpendicular to the cross rail member. The clamping assembly is pivotally mounted to this cylindrical portion of the end cap.

The clamp generally includes an upper clamp member, a lower clamp member and a bolt which adjustably connects the two clamp members. The upper clamp member has a first vertical portion, which includes a transverse notch to receive the cylindrical portion of the end cap and a longitudinal slot for receiving the lower clamp member, and a second outwardly extending portion which overlays the top of the side rail when the clamp is secured. The lower clamp member extends partially into the slot of the upper clamp member with the adjustment bolt extending downwardly through the upper clamp member and into the portion of the lower clamp member disposed within the slot. The lower clamp member also includes an outwardly extending portion which underlays the side rail when the clamp is secured. Thus, the upper clamp member and the lower clamp member form a C-shaped clamping channel within which the side rail is received.

Adjustment of the clamping channel is accomplished by rotating the bolt in order to cause the lower clamp member to travel along the slot in the upper clamp member. In addition, the clamp is pivotally secured to the end cap to accommodate slight variations in the angular position of the cross rail relative to the side rail. This feature is particularly advantageous during installation of the cross rail wherein one end of the rail may be attached at a time.

Other objects, features, and advantages of the present invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views, and in which:

FIG. 1 is an elevated perspective of a luggage carrier embodying the present invention;

FIG. 2 is an exploded view of the clamping mechanism of the present invention; and FIG. 3 is a partial cross-sectional perspective of the clamping mechanism of the present invention.

DETAILED DESCRIPTION OF A PREFERRED EMBODIMENT OF THE PRESENT INVENTION

Referring first to FIG. 1, a luggage carrier 10 mounted to a surface 12 of a motor vehicle and embodying the present invention is there shown. The luggage carrier 10 includes a substantially rectangular frame 14 supported in a spacial relationship above the surface 12 of the vehicle by a plurality of support stanchions 16. Generally, the support stanchions 16 are disposed at the corners of the frame 14 but any number and placement of the stanchions 16 may be utilized to maintain the frame 14 in an elevated position. Moreover, the frame 14 may be any configuration which facilitates transportation of cargo. In the preferred construction, the frame 14 comprises a pair of longitudinal side rails 18 which extend from the corner mounted stanchions 16. Also included are end rails 20 which extend between the stanchions 16 and the side rails 18. Thus, the frame 14 forms a parallel plane supported above the vehicle surface 12 by the support stanchions 16.

The suspended load-bearing surface of the luggage carrier 10 is formed by a plurality of cross rails 22 which extend between the side rails 18 of the frame 14. Thus, in the preferred embodiment, the cross rails 22 extend transversely from one side rail 18 to the other. However, it is to be understood that the rails 22 can be mounted longitudinally between the end rails 20. Each of the cross rails 22 are detachably secured to the peripheral rails by an adjustable clamp 24 mounted to the ends 26 of an elongated cross rail member 28. As is shown in FIG. 2, the elongated cross rail member 28 has a substantially oval cross-section in order to reduce wind resistance during travel.

Referring now to FIGS. 2 and 3, the ends 26 of the cross rail member 28 are provided with end caps 30. The end caps 30 include an inwardly extending portion fixedly received within the end 26 of the rail member 28. The ends 26 are preferably hollow so as to facilitate insertion of the end cap 30. Upon insertion, the end cap 30 may be fixedly secured to the rail member 28 by a mounting screw 32. Alternatively, the end cap 30 may be integrally formed with the rail member 28 to reduce assembly. As is shown in FIG. 2, the end cap 30 has a substantially T-shaped protrusion 34 which extends axially from the center of the rail member 28. This T-shaped protrusion 34 is formed by an outwardly extending portion 36 and a cylindrical cross portion 38 disposed perpendicular to the outwardly extending portion 36 and the rail member 28. The cylindrical cross portion 38 of the end cap 30 allows pivotal movement of the clamping mechanism 24 as will be subsequently described.

Mounted to the end cap 30 is a clamp 40 which comprises an upper clamp member 42, a lower clamp member 44, and means 46 for adjustably connecting the lower clamp member 44 to the upper clamp member 42. Once assembled, the clamp 40 forms a substantially C-shaped clamping channel to clampingly engage the side rail 18 as shown in FIG. 3. The upper clamp member 42 includes a first vertical portion 48 and a second portion 50 which extends outwardly from the top of the first portion 48 and overlies the rail 18 upon engagement. In addition, a retaining lip 52 is formed at the end of the outwardly extending second portion 50. Formed down the center of the vertical portion 48 and extending substantially the length thereof is an elongated slot 54. The slot 54 has a width large enough to receive lower clamp member 44 and also the cylindrical cross portion 38 of the end cap 30 during assembly. At the bottom of the slot 54 is formed a transverse notch 56 having a substantially semicylindrical configuration which closely conforms to the circumferential configuration of the cylindrical portion 38 of the end cap 30. The notch is formed in the outer face 58 of the first vertical portion 48 away from the cross rail member 28 yet is engaged by the end cap 30 upon assembly of the clamp 40 as will be described herein.

The lower clamp member 44 forms the underlying portion of the clamping channel and includes an outwardly extending flange 60. The flange 60 extends at a slight angle upwardly from the base portion 62 of the lower clamp member 44. The angle of the flange 60 ensures flush abutment with the bottom surface of the rail 18 thereby providing secure clamping engagement. Additionally, the lower clamp member 44 includes a downwardly depending flange 64 which limits the pivoting movement of the lower clamp member 44 and secures the T-shaped protrusion in the notch 56.

Referring still to FIGS. 2 and 3, the clamping mechanism 24 is assembled essentially utilizing the connecting means 46. After attaching the end cap 30 to the rail member 28, the T-shaped protrusion 34 of the end cap 30 is passed through the slot 54 in the upper clamp member 42. However, because of the alignment of the slot 54, the upper clamp member 42 must first be rotated 90° so that the slot 54 is aligned with the cylindrical cross portion 38 of the end cap 30. Once the cylindrical cross portion 38 is extended through the slot 54, the upper clamp member 42 can be rotated to its original position. Thereafter, the upper clamp member 42 is shifted upwardly until the cross portion 38 rests within the transverse notch 56. At this point the lower clamp member 44 can be connected to the upper clamp member 42 to form the clamping channel.

The clamp 40 is assembled by inserting the base portion 62 of the lower clamp member 44 into the slot 54. The connecting means 46 interconnects the two components to form the clamping channel. In the preferred embodiment, the connecting means 46 includes a bolt 70 which cooperates with throughbores 72 and 74 formed in the upper and lower clamp members 42 and 44, respectively. The throughbore 74 is provided with threads which cooperate with the threads 76 of the bolt 70. Conversely, the throughbore 72 is not threaded so that the bolt 70 is free to rotate therein. However, upon rotation of the bolt 70 the lower clamp member 44 will be caused to move longitudinally in the slot 54 depending upon the direction of rotation. Thus, the bolt 70 of the connecting means 46 extends through the throughbore 72 formed in the vertical portion 48 of the upper clamp member 42, into the slot 54, and threadably engages the throughbore 74 of the lower clamp member 44.

With the clamp mechanism 24 fully assembled, the device can be attached to the rail 18. Initially, the clamping channel must be expanded to facilitate insertion of the rail 18 by rotating the bolt 70 counter-clockwise thereby causing the lower clamp member 44 to move downwardly in the slot 54. Once a large enough channel is formed, the clamp is attached to the rail 18 such that the second portion 50 of the upper clamp member 42 overlies the rail 18 while the flange 60 of the lower clamp member 44 underlies the rail 18. Moreover, the retaining lip 52 of the upper clamp member 42 should extend over the outer edge of the rail 18 to prevent the rail 18 from being inadvertently removed from the clamp 40. Thereafter, the clamp is tightened by rotating the bolt 70 clockwise to draw the lower clamp member 44 towards the rail 18 into secure clamping engagement therewith.

Thus, the present invention provides an adjustable cross rail 22 for forming a load-bearing rack for a luggage carrier 10 which is suspended below the frame 14 of the carrier 10 between the plane formed by the frame 14 and the vehicle surface 12. The device also facilitates attachment of the cross rail 22 by one person because of the pivoting capabilities of the clamp 40 relative to the cross rail member 28 which allows attachment of one end of the rail at a time. The clamp 40 pivots about the cylindrical cross portion 38 of the end cap 30 which is maintained within the notch 56 of the upper clamp member 42 by the downwardly depending flange 64 of the lower clamp member 44 as shown in FIG. 3. Thus, the flange 64 engages the cross portion 38 of the end cap 30 to prevent it from releasing from the notch 56 thereby allowing the clamp 40 to pivot about the cylindrical cross portion.

The foregoing detailed description has been given for clearness of understanding only and no unnecesary limitations should be understood therefrom as some modifications will be obvious to those skilled in the art without departing from the scope and spirit of the appended claims.

I claim:

1. In a luggage carrier adapted to be mounted to an exterior surface of a vehicle and having a substantially rectangular frame forming a plane and supported in spacial relationship above the vehicle surface, the frame including two side rails, at least one cross rail for forming a load-bearing rack suspended from said frame, said cross rail comprising:
    an elongated cross rail member having opposite ends;
    an adjustable clamp mounted to each end of said cross rail member, said clamp including an upper clamp member adapted to receive the end of said rail member, a lower clamp member received within said upper clamp member, and means for adjustably connecting said lower clamp member to said upper clamp member thereby forming an adjustable clamping channel to clampingly engage the side rail of the frame, said clamp securing said cross rail for longitudinal adjustment along said side rails in suspended relation between the plane formed by said frame and the vehicle surface.

2. The cross rail as defined in claim 1 wherein said ends of said cross rail member are independently detachably secured to said side rails of said frame by said clamps.

3. The cross rail as defined in claim 2 wherein said ends of said cross rail member include substantially T-shaped end caps having an inwardly extending portion fixedly received within said cross rail member.

4. The cross rail as defined in claim 3 wherein said T-shaped end caps include a cylindrical cross portion disposed perpendicular to said cross rail member.

5. The cross rail as defined in claim 4 wherein said clamps are pivotally mounted to said end caps.

6. The cross rail as defined in claim 5 wherein said upper clamp member and said lower clamp member form a substantially C-shaped clamping channel to clampingly engage said side rail.

7. The cross rail as defined in claim 6 wherein said upper clamp member comprises a first vertical portion, a second portion extending outwardly from said vertical portion, and a retaining lip depending from said second portion.

8. The cross rail as defined in claim 7 wherein said upper clamp member includes a transverse notch formed in said first vertical portion for receiving said cross portion of said T-shaped end cap.

9. The cross rail as defined in claim 8 wherein said upper clamp member includes an elongated slot formed in said first vertical portion of said upper clamp member perpendicular to said notch, said T-shaped end cap extending through said slot.

10. The cross rail as defined in claim 9 wherein said lower clamp member is received within said slot of said upper clamp member.

11. The cross rail as defined in claim 10 wherein said means for adjustably connecting comprises a bolt extending through said first vertical portion of said upper clamp member and into said lower clamp member disposed within said slot wherein said lower clamp member is longitudinally movable within said slot upon rotation of said bolt thereby adjustably varying said clamping channel.

12. A cross rail for forming a load-bearing rack of a luggage carrier adapted to be mounted to an exterior surface of a vehicle, the luggage carrier including a substantially rectangular frame forming a plane and supported in spacial relationship above the vehicle surface and having two side rails, said cross rail comprising:
    an elongated cross rail member having substantially T-shaped end caps mounted to the ends of said cross rail member, said T-shaped end caps including a cylindrical cross portion; and
    an adjustable clamp pivotally mounted to each end cap of said cross rail member for independently detachably securing said cross rail to said side rail in suspended relation between the plane formed by said frame and the vehicle surface;
    said clamp including an upper clamp member, a lower clamp member received by said upper clamp member, and means for adjustably connecting said lower clamp member to said upper clamp member thereby forming an adjustable clamping channel.

13. The cross rail as defined in claim 12 wherein said upper clamp member includes a transverse notch for pivotally receiving said cross portion of said T-shaped end cap.

14. The cross rail as defined in claim 12 wherein said means for adjustably connecting comprises a bolt extending through said upper clamp member and into said lower clamp member wherein rotation of said bolt adjustably varies said clamping channel.

15. The cross rail as defined in claim 14 wherein said clamping channel receives said side members of said frame.

16. A luggage carrier adapted to be mounted to an exterior surface of a vehicle, the carrier including a frame having a pair of side rails forming a plane and supported in spacial relationship above the vehicle surface, at least one cross rail extending between said side rails and forming a load-bearing rack, and a pair of adjustable clamps for supporting the ends of said cross rail in suspended relation between the plane formed by said frame and the vehicle surface, each said clamp comprising:

an upper clamp member pivotally connected to the end of said cross rail, said upper clamp member adapted to overlay a portion of said side rail;

a lower clamp member received by said upper clamp member, said lower clamp member movable with respect to said upper clamp member; and means for adjustably connecting said lower clamp member to said upper clamp member such that said lower clamp member underlies a portion of said side rail in opposing relation to said upper clamp member thereby forming an adjustable clamping channel to clampingly engage said side rail.

17. The clamp as defined in claim 16 wherein the ends of said cross rail include substantially T-shaped end members.

18. The clamp as defined in claim 17 wherein said T-shaped end caps include a cylindrical cross portion disposed perpendicular to said cross rail.

19. The clamp as defined in claim 18 wherein said upper clamp member includes a transverse notch for receiving said cross portion of said T-shaped end cap, said clamp being pivotally connected to said cross portion of said end cap.

20. The clamp as defined in claim 19 wherein the ends of said cross rail are independently detachably secured to said side rails of said frame by said clamps.

* * * * *